United States Patent
Han (10) Patent No.: US 9,187,094 B2
(45) Date of Patent: Nov. 17, 2015

(54) DEVICE AND METHOD FOR CONTROLLING SPEED OF VEHICLE

(71) Applicant: MANDO CORPORATION, Pyeongtaek-si, Gyeonggi-do (KR)

(72) Inventor: Kwangjin Han, Seongnam-si (KR)

(73) Assignee: MANDO CORPORATION, Pyeongtaek-Si, Gyeonggi-Do (KR)

( * ) Notice: Subject to any disclaimer, the term of this patent is extended or adjusted under 35 U.S.C. 154(b) by 0 days.

(21) Appl. No.: 14/307,530

(22) Filed: Jun. 18, 2014

(65) Prior Publication Data

US 2015/0151756 A1 Jun. 4, 2015

(30) Foreign Application Priority Data

Nov. 29, 2013 (KR) .................. 10-2013-0147195

(51) Int. Cl.
*B60T 8/32* (2006.01)
*G08G 1/09* (2006.01)
*B60W 30/14* (2006.01)
*B60W 10/06* (2006.01)
(Continued)

(52) U.S. Cl.
CPC ............ *B60W 30/146* (2013.01); *B60W 10/06* (2013.01); *B60W 10/188* (2013.01); *B60W 30/04* (2013.01); *B60W 40/06* (2013.01); *B60W 40/072* (2013.01)

(58) Field of Classification Search
CPC ............ B60K 31/0066; B60K 31/105; B60W 10/184; B60W 30/04; B60W 40/072; B60W 40/10; B60W 40/105; B60W 50/14; Y10T 477/87; Y10T 477/877; Y10T 477/878; Y10T 152/10036; Y10T 152/10612; G01C 21/3697; G08G 1/166; G08G 1/167; G08G 1/096827; G08G 1/0112; G08G 1/0141; G08G 1/04; G08G 1/09626; G08G 1/096716; G08G 1/096741; G08G 1/096775; G08G 1/096844; G08G 1/096888; G08G 1/161; G08G 1/165
USPC ............... 701/93, 79, 96, 110, 119, 121, 497; 340/905, 936, 969, 978, 441, 444

See application file for complete search history.

(56) References Cited

U.S. PATENT DOCUMENTS 6,330,519 B1 * 12/2001 Sawatari ............ B60Q 1/0023
250/338.1
2004/0016870 A1 * 1/2004 Pawlicki ................ G08G 1/167
250/208.1
(Continued)

FOREIGN PATENT DOCUMENTS

JP 2010204895 A 9/2010
KR 100781102 B1 11/2007
(Continued)

OTHER PUBLICATIONS

Korean Office Action for application No. 10-2013-0147195 dated Mar. 13, 2015.
(Continued)

*Primary Examiner* — Muhammad Shafi
(74) *Attorney, Agent, or Firm* — Hauptman Ham, LLP (57) ABSTRACT

The present invention relates to a device and a method for controlling a speed of a vehicle. A safe speed of the vehicle is determined based on a curvature of a forward path and weather conditions. When a travelling speed of the vehicle is higher than the safe speed, the speed of the vehicle is controlled such that the vehicle is decelerated.

4 Claims, 6 Drawing Sheets

(51) Int. Cl.
*B60W 10/188* (2012.01)
*B60W 30/04* (2006.01)
*B60W 40/072* (2012.01)
*B60W 40/06* (2012.01)

(56) References Cited

U.S. PATENT DOCUMENTS

2005/0203692 A1* 9/2005 Suzuki ............... B60K 31/0066
 701/70
2010/0246889 A1* 9/2010 Nara .................. G06K 382/104
 382/104

FOREIGN PATENT DOCUMENTS

KR 1020090009473 A 1/2009
KR 101103251 B1 12/2011

OTHER PUBLICATIONS

Korean Office Action for Korean Application No. 10-2013-0147195 dated May 22, 2015.

* cited by examiner

DEVICE AND METHOD FOR CONTROLLING SPEED OF VEHICLE

CROSS-REFERENCE TO RELATED APPLICATION

This application claims priority from and the benefit under 35 U.S.C. §119(a) of Korean Patent Application No. 10-2013-0147195, filed on Nov. 29, 2013, which is hereby incorporated by reference for all purposes as if fully set forth herein.

BACKGROUND OF THE INVENTION

1. Field of the Invention

The present invention relates to a device and a method for controlling a speed of a vehicle.

2. Description of the Prior Art

In general, vehicles travel by moving forwards or backwards or turning leftwards or rightwards, and the travelling speed of the vehicles is controlled by the proper operation of an acceleration pedal and a brake pedal.

When a vehicle travelling at a higher speed than the speed limit turns leftwards or rightwards at an angle larger than a prescribed angle, a rolling phenomenon arises in which the vehicle is tilted in a direction opposite to the turning direction of the vehicle. In particular, when the vehicle turns a corner, a centrifugal force is applied to the vehicle body, and therefore, it is absolutely necessary to decelerate the vehicle. If a driver ignores it and drives the vehicle on a curved road, the vehicle is in danger of being turned over.

For the conventional vehicle, a driver determines the speed of the vehicle by manipulating an acceleration pedal and a brake pedal according to conditions of a road. Accordingly, in a case where the driver does not properly cope with a change in natural environment, such as snow or rain, in a curved road on account of his/her poor driving or an over-speed, if the vehicle comes around a sharp bend in the road without being decelerated, the vehicle is more likely to run off the road or to be turned over.

SUMMARY OF THE INVENTION

The present invention has been made in an effort to solve the above-described problems associated with prior art. An aspect of the present invention is to provide a device and a method for controlling a vehicle speed which can sense a front corner in advance and control the vehicle speed while the vehicle is being driven, thereby maintaining the vehicle stability.

In accordance with one aspect of the present invention, a device for controlling a vehicle speed is provided. The device includes: a digital map that determines a current location of a vehicle and a curvature of a forward path; a safe speed determining unit that determines a safe speed for the vehicle based on the curvature of the forward path; a vehicle speed sensor that measures a travelling speed of the vehicle; and a controller that controls the vehicle speed, such that the vehicle is decelerated when the travelling speed of the vehicle is higher than the safe speed.

The device may further include a weather information extracting unit that extracts weather conditions outside the vehicle, and the safe speed determining unit may determine the safe speed of the vehicle based on the weather conditions.

A digital map may calculate the curvature of the forward path based on the current location of the vehicle and locations of at least two points on the forward path.

The safe speed determining unit may calculate allowable lateral acceleration based on the curvature of the forward path, and the safe speed based on the allowable lateral acceleration.

The device may further include a weather information extracting unit that extracts weather conditions outside the vehicle, and the safe speed determining unit may reduce the safe speed by a predetermined amount or rate when the weather information extracting unit judges that it is snowing, raining, or foggy, or the forward path is frozen. Furthermore, the safe speed determining unit may calculate the safe speed by reducing the allowable lateral acceleration by a predetermined amount or rate when the weather information extracting unit judges that it is snowing, raining, or foggy, or the forward path is frozen.

The weather information extracting unit may include a driver operated sensor for sensing an operation of a driver according to the weather conditions or a detecting sensor for sensing a state outside the vehicle. The driver operated sensor may include at least one of a sensor for sensing an operation of a wind shield wiper and a sensor for sensing an operation of a fog light. The detecting sensor may include at least one of a rain sensor, a fog sensor, or a temperature sensor.

The weather information extracting unit may include a communication unit that receives weather information or road information from the outside.

The controller may control the vehicle speed by controlling an engine or a brake.

The controller may control the vehicle speed based on a difference between the travelling speed of the vehicle and the safe speed, and a distance between the current location of the vehicle and a region where the safe speed is set.

The controller may control the vehicle speed based on a difference between an average travelling speed of the vehicle and the safe speed.

The device may further include a cruise controller that maintains the vehicle at a cruise speed set by a driver, and the controller may control the vehicle speed based on the lower value of the safe speed and the cruise speed.

The device may further include an alarm unit that generates a warning signal for a driver when the travelling speed of the vehicle is higher than the safe speed.

In accordance with another aspect of the present invention, a method of controlling a vehicle speed is provided. The method includes: determining a current location of a vehicle and a curvature of a forward path; determining a safe speed of the vehicle based on the curvature of the forward path; measuring a travelling speed of the vehicle; and controlling the vehicle speed such that the vehicle is decelerated when the travelling speed of the vehicle is higher than the safe speed.

As described above, the present invention provides a device and a method for controlling a vehicle speed which can sense a front corner in advance and control the vehicle speed while the vehicle is being driven, thereby maintaining the vehicle stable.

DETAILED DESCRIPTION OF THE EXEMPLARY EMBODIMENTS

Hereinafter, some embodiments of the present invention will be described in detail with reference to the accompanying drawings. In the following description, the same elements will be designated by the same reference numerals although they are shown in different drawings. Further, in the following description of the present invention, a detailed description of known functions and configurations incorporated herein will be omitted when it may make the subject matter of the present invention rather unclear.

In addition, terms, such as first, second, A, B, (a), (b) or the like may be used herein when describing components of the present invention. These terms are merely used to distinguish one structural element from other structural elements, and a property, an order, a sequence and the like of a corresponding structural element are not limited by the term. It should be noted that if it is described in the specification that one component is "connected," "coupled" or "joined" to another component, a third component may be "connected," "coupled," and "joined" between the first and second components, although the first component may be directly connected, coupled or joined to the second component.

Figure 1:
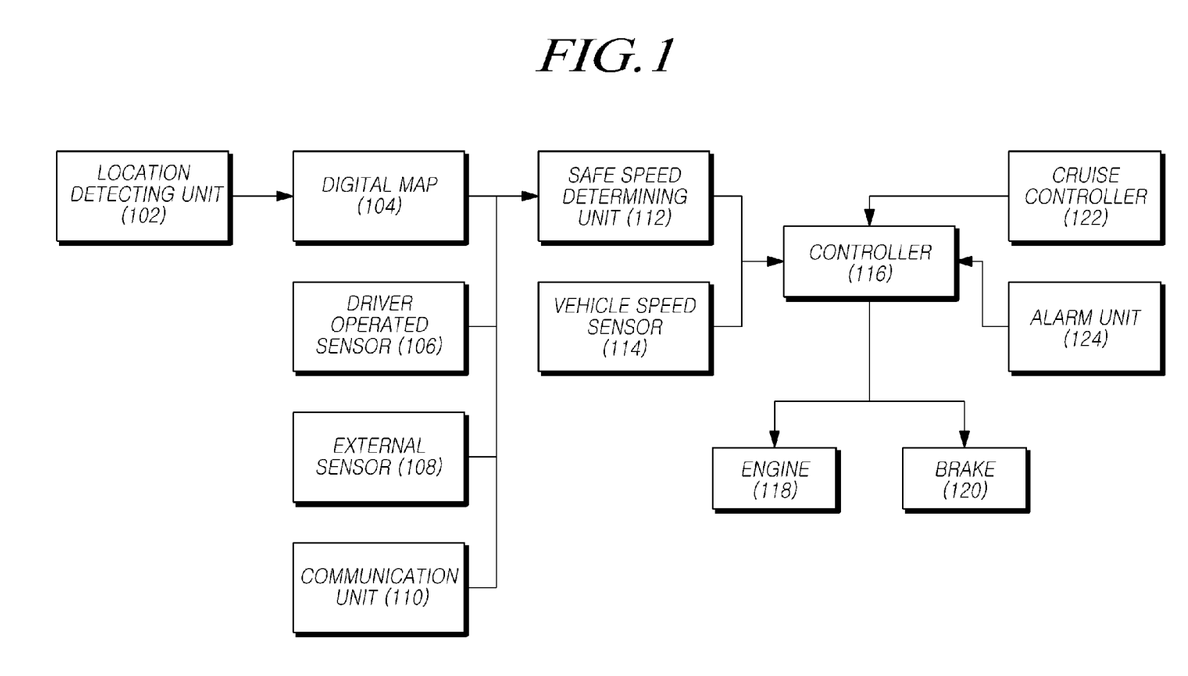
FIG. 1 is a block diagram illustrating a configuration of a vehicle speed control device according to an embodiment of the present disclosure.

FIG. 1 is a block diagram illustrating a configuration of a vehicle speed control device according to an embodiment of the present disclosure.

Referring to FIG. 1, the vehicle speed control device 100 includes a location detecting unit 102, a digital map 104, a driver operated sensor 106, an external sensor 108, a communication unit 110, a safe speed determining unit 112, a vehicle speed sensor 114, a controller 116, an engine 118, a brake 120, a cruise controller 122, and an alarm unit 124.

The location detecting unit 102 may detect a current location of a vehicle and, for example, may use signals received from a satellite, such as a Global Positioning System (GPS).

The digital map 104 extracts a curvature (a radius of curvature) of a forward path along which the vehicle will travel, based on the current location of the vehicle detected by the location detecting unit 102. In order to determine a safe speed, the safe speed determining unit 112 may use the curvature of the forward path extracted by the digital map 104.

Figure 2:
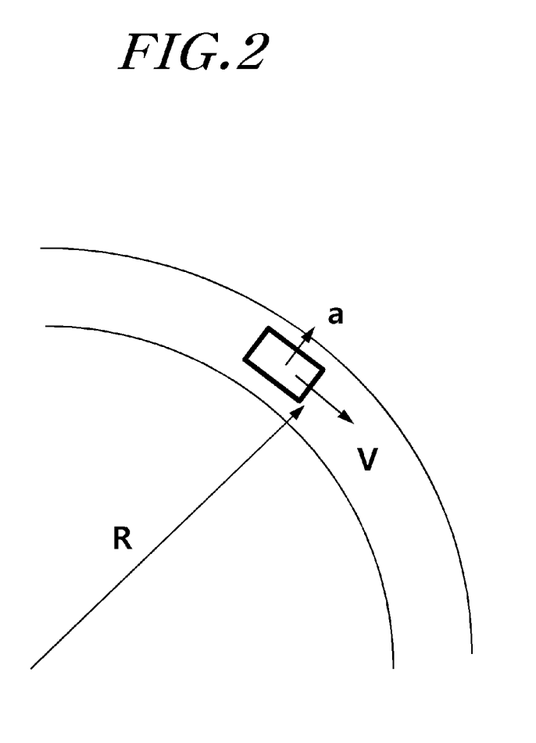
FIG. 2 is a view for explaining a speed and lateral acceleration of a vehicle.

FIG. 2 is a view for explaining a curvature of a forward path, and a speed and lateral acceleration of a vehicle.

Referring to FIG. 2, a vehicle, when travelling at a speed (V) in a curved road having a curvature 1/R (or a radius of curvature R), may be accelerated at lateral acceleration (a) by a centrifugal force. The lateral acceleration is given by Equation $a=V^2/R$ and increases in proportion to the square of the speed (V) with an increasing speed of the vehicle. When the centrifugal force is greater than the resistance force between a surface of the load and wheels of the vehicle due to the increasing lateral acceleration, the vehicle may slide to the outside of the curved road by the centrifugal force. Furthermore, when the vehicle is tilted due to the lateral acceleration, the vehicle may be turned over.

Accordingly, in order to reduce the lateral acceleration (a) of the vehicle in the curved road, the speed (V) of the vehicle has to be decreased, and the decreased speed of the vehicle may be determined by the curvature 1/R of the curved path.

Thus, the curvature of the forward path determined by the digital map 104 may be used to determine a safe speed.

Figure 3:
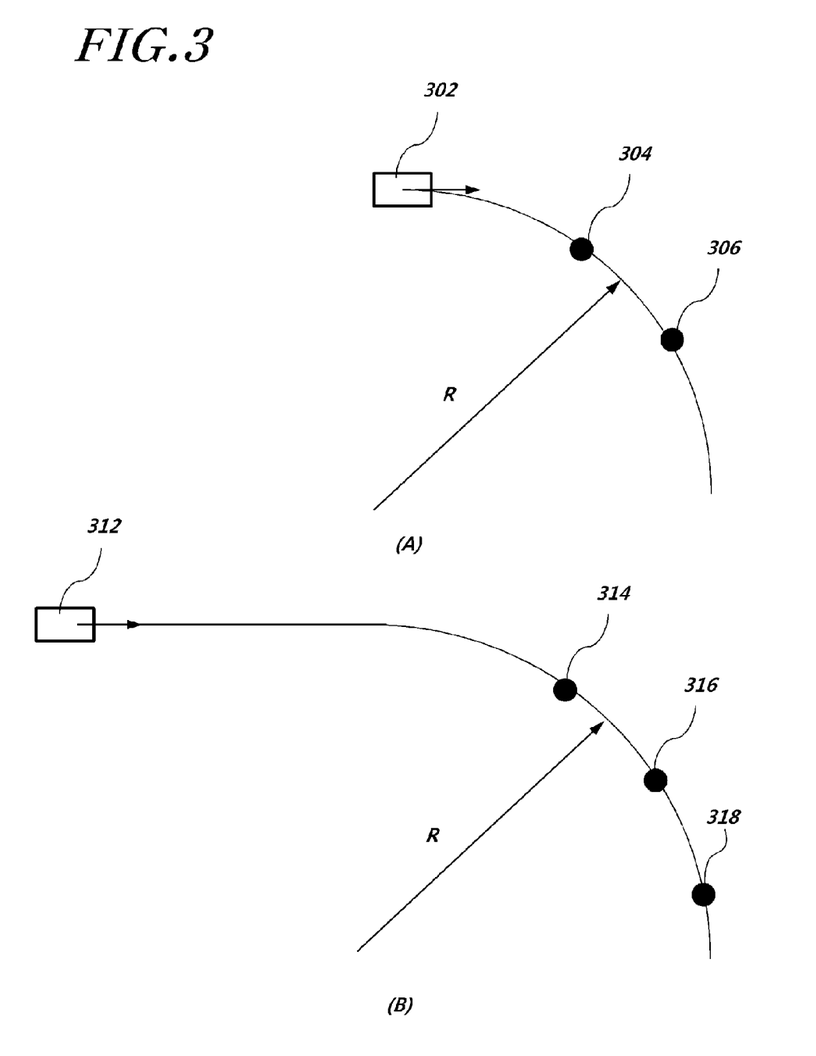
FIGS. 3A and 3B illustrate examples of a method of determining a curvature of a vehicle path.

FIGS. 3A and 3B illustrate examples of a method of determining a curvature of a vehicle path by the digital map 104.

In FIGS. 3A and 3B, the digital map 104 receives coordinates of two or more points on a forward path. When a vehicle path is designated, the digital map 104 may receive coordinates of points on the designated vehicle path. In contrast, when the vehicle path is not designated, the digital map 104 may receive coordinates of points on a road along which the vehicle is travelling.

Referring to FIG. 3A, the digital map 104 may determine a curvature (1/R) of a vehicle path through coordinates 302, 304, and 306 of three or more points including the current coordinate 302 of a vehicle. In more detail, a circle passing through the points may be determined by the coordinates 302, 304, and 306 of the three or more points, and the curvature may be calculated through the circle.

Referring to FIG. 3B, when a vehicle is travelling along a straight path, and there is a curved path subsequent to the straight path, the digital map 104 may determine a curvature (1/R) of the curved path through coordinates 314, 316, and 318 of three or more points on the forward curved path other than a current coordinate 312 of the vehicle. In more detail, a circle passing through the points may be determined by the coordinates 314, 316, and 318 of the three or more points, and the curvature may be calculated through the circle.

Figure 4:
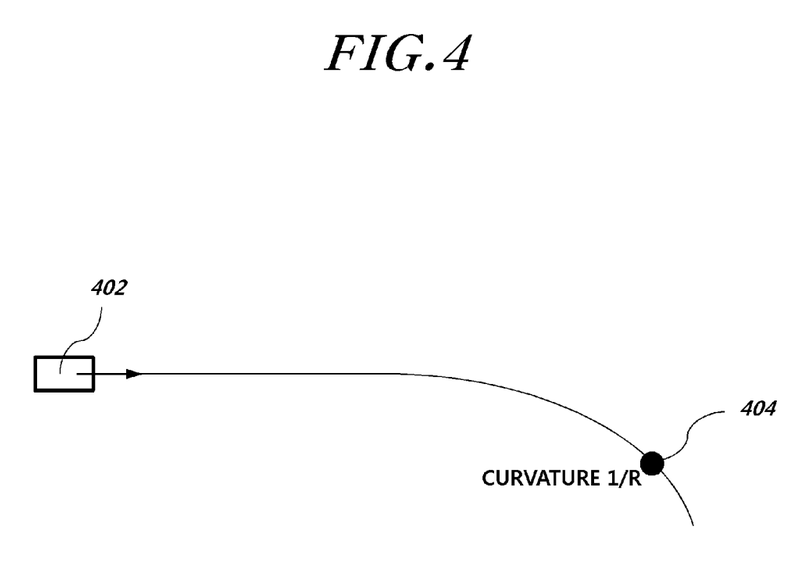
FIG. 4 illustrates another example of a method of determining a curvature of a vehicle path.

FIG. 4 illustrates another example of a method of determining a curvature of a vehicle path by the digital map 104. Referring to FIG. 4, the digital map 104 may receive a curvature 1/R at at least one point 404 on a forward path of a vehicle 402. When the digital map 104 receives curvatures at a plurality of points on the forward path, the maximum value of the plurality of curvatures (or the minimum value of radii of curvature) may be used to calculate a safe speed.

Figure 5:
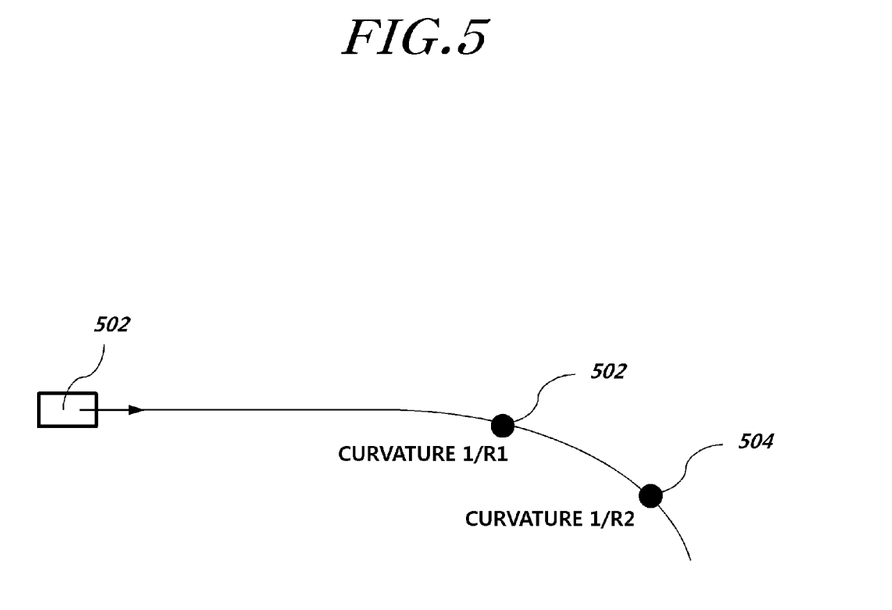
FIG. 5 illustrates another example of a method of determining a curvature of a vehicle path.

FIG. 5 illustrates another example of a method of determining a curvature of a vehicle path by the digital map 104. Referring to FIG. 5, the digital map 104 receives the maximum curvature (or the minimum radius of curvature) of curvatures (or radii of curvature) at a plurality of points on a forward path. In the example illustrated in FIG. 5, a curvature at a point 502 on the forward path of a vehicle 502 is 1/R1, and a curvature at a point 504 is 1/R2. When the curvature at the point 504 is larger than that at the point 502 (1/R2>1/R1), the vehicle may receive the curvature 1/R2 at the point 504 as the maximum curvature.

In determining the safe speed, weather conditions (snow, rain, fog, etc.) outside a vehicle or road conditions (freezing, etc.) as well as a curvature of a road may be considered. For example, when a road is slippery with the rain or snow, a friction force between the road and a tire of a vehicle may be reduced, and the vehicle may also slide to the outside of the curved road due to smaller lateral acceleration.

In order to extract information on external weather conditions, the vehicle speed control device 100 may include the driver operated sensor 106. The driver operated sensor 106 may include, for example, a sensor for sensing an operation of a wind shield wiper, a sensor for sensing an operation of a fog light, and the like. When a driver operates the wind shield wiper on account of the rain or snow, the sensor for sensing the operation of the wind shield wiper may determine that it is raining or snowing. When the driver operates the fog light on account of fog, the sensor for sensing the operation of the fog light may determine that it is foggy.

Furthermore, in order to extract the information on the external weather conditions, the vehicle speed control device 100 may include the external sensor 108. The external sensor 108 may include a rain sensor, a fog sensor, a temperature sensor, and the like. The rain sensor may determine whether it is raining or snowing, the fog sensor may determine whether it is foggy, and the temperature sensor may determine whether a road is likely to be frozen due to a low temperature.

Moreover, in order to extract the information on the external weather conditions, the vehicle speed control device 100 may include the communication unit 110. The communication unit 110 may communicate with an external object providing weather information to receive weather information or road information.

The safe speed determining unit 112 may determine the safe speed of the vehicle based on the curvature of the forward path determined by the digital map 104 and the information on the weather conditions. The safe speed determining unit 112 may calculate the safe speed by which lateral acceleration is prevented from exceeding a predetermined reference value, based on the curvature of the forward path determined by the digital map 104. The predetermined reference value may correspond to a value by which the vehicle is prevented from sliding or rolling in a lateral direction.

The safe speed determining unit 112 may consider the information on the weather conditions to determine the safe speed of the vehicle. That is, the safe speed determining unit 112 may reduce the safe speed when it is determined that it is snowing, raining, or foggy.

In an example, when it is determined that it is snowing, raining, or foggy, the safe speed determining unit 112 may determine the final safe speed by reducing the safe speed calculated in view of only the curvature of the forward path, other than the weather conditions by a predetermined amount or rate.

In another example, when it is determined that it is snowing, raining, or foggy, the safe speed determining unit 112 may reduce the predetermined reference value in view of a decrease in friction of a road due to the snow, rain, or fog. The safe speed may be calculated as a value by which the lateral acceleration is prevented from exceeding the predetermined reference value.

The safe speed may correspond to a safe speed at a specific point or in a specific region according to the type thereof. Furthermore, the controller 116 may receive, from the digital map 104, information such as a distance between a current location and the specific point or region where the safe speed has been set, estimated time of arrival at the specific point or in the specific region, a range of the specific region, an average travelling speed in the specific region, and the like.

Meanwhile, the vehicle speed control device 100 includes the vehicle speed sensor 114. The vehicle speed sensor 114 may be a sensor for measuring the vehicle speed using a rotating speed of a vehicle wheel while being attached to a vehicle. Furthermore, as a device for measuring coordinates of a vehicle such as a GPS, the vehicle speed sensor 114 may be a sensor for measuring a vehicle speed using displacement of a vehicle according to time.

When the safe speed determined by the safe speed determining unit 112 is higher than the longitudinal speed of the vehicle measured by the vehicle speed sensor 114, the controller 116 may reduce the speed of the vehicle by manipulating the engine 118 and/or the brake 120. That is, the controller 116 may reduce the speed of the vehicle by controlling a degree of opening/closing a throttle valve of the engine 118, or creating pressure of the brake 120.

When the safe speed is lower than the vehicle speed in a region which the vehicle is currently located, the controller 116 may immediately reduce the speed of the vehicle. Furthermore, when it is determined through measurement or estimation of an average speed that the average speed is higher than the safe speed on account of an over-speed in some regions, the controller 116 decelerates the vehicle to a travelling speed lower than the safe speed so that the average speed may conform to the safe speed in the region where the safe speed has been set.

When a safe speed in a front region is lower than the vehicle speed, the controller 116 may slow down the vehicle speed using information, such as a difference between the safe speed and the current vehicle speed, a distance from the current location to the region where the safe speed has been set, and the like, such that the vehicle speed becomes lower than the safe speed before the vehicle reaches the region where the safe speed has been set. Furthermore, the controller 116 may restrict or control engine torque in view of the safe speed to prevent the vehicle from being excessively or unnecessarily accelerated.

In addition, even when the vehicle speed is lower than the safe speed, the controller 116 may restrict or control acceleration of the vehicle to prevent the vehicle speed from exceeding the safe speed.

The vehicle speed control device 100 may further include the cruise controller 122. The cruise controller 122 may perform a cruise control or an Adaptive Cruise Control (ACC) to accelerate or decelerate the vehicle according to a cruise speed set by a driver.

In an example, the controller 116 may control the speed of the vehicle based on the lower value of the safe speed determined by the safe speed determining unit 112 and the cruise speed set by the cruise controller 122. That is, the controller 116 may make a control such that the speed of the vehicle becomes lower than the cruise speed set by a user and the safe speed of the vehicle.

In another example, the controller 116 may control the speed of the vehicle based on the lower value of the safe speed determined by the safe speed determining unit 112, the cruise speed set by the cruise controller 122, and the vehicle speed determined based on a distance from the vehicle ahead and a current vehicle speed. That is, the controller 116 may make a control such that the speed of the vehicle becomes lower than the cruise speed set by a user, the speed for prevention of a collision with the vehicle ahead, and the safe speed of the vehicle.

The vehicle speed control device 100 may further include the alarm unit 124. When the speed of the vehicle is higher than the safe speed, the alarm unit 124 may display a warning signal to a user and induce the user to slow down the speed of the vehicle. Furthermore, when the controller 116 controls the speed of the vehicle based on the safe speed and the current vehicle speed, the alarm unit 124 may display that the speed of the vehicle is controlled based on the safe speed. Moreover, when the vehicle passes through a point or a region where the safe speed has been set so that the vehicle speed control is terminated, the alarm unit 124 may remove the warning to notify of the fact.

The alarm unit 124 may be an audio/video/haptic device.

For the audio/video device, the alarm unit 124 may represent a signal for notifying a user that a vehicle is necessary to decelerate, a signal for notifying a user of a current vehicle speed, a signal for notifying a user of a safe speed (namely, a control target speed), a signal for notifying a user that a speed of a vehicle is being controlled, and the like.

For the haptic device, the alarm unit 124 may notify a user that a vehicle is necessary to decelerate, or may notify the user that a speed of a vehicle is being controlled, through vibration of a seat, a belt, a handle, or the like.

Figure 6:
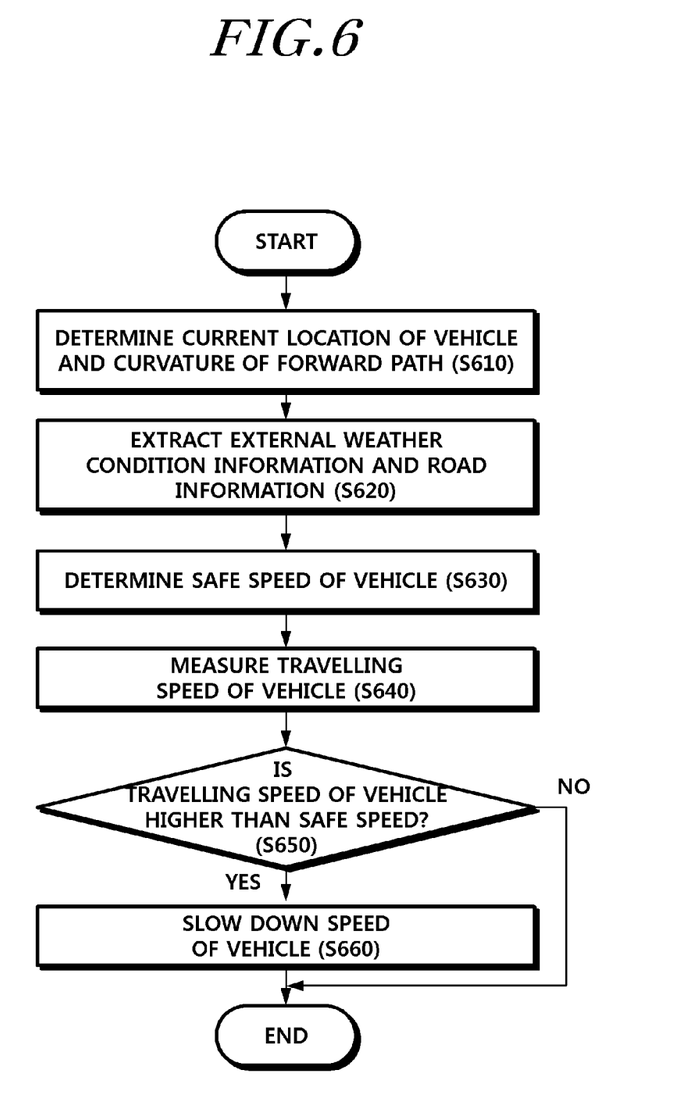
FIG. 6 is a flowchart illustrating a method of controlling a vehicle speed according to an embodiment of the present invention.

FIG. 6 is a flowchart illustrating a method of controlling a vehicle speed according to an embodiment of the present invention.

Referring to FIG. 6, a vehicle speed control device of a vehicle determines a current location of the vehicle and a curvature of a forward path (step S610). The curvature of the forward path may be calculated from a current coordinate of the vehicle and coordinates of at least two points on the forward path. Furthermore, the curvature of the forward path may be acquired through the receiving of a curvature of at least one point on the forward path. Moreover, the curvature of the forward path may be acquired through receiving the maximum curvature on the forward path.

The vehicle speed control device of the vehicle extracts information on weather conditions outside the vehicle or information on a road (step S620). The information on the external weather conditions or the information on the road may be acquired through a driver operated sensor for determining whether a wind shield wiper, a fog light, and the like are operated by a driver's manipulation. Furthermore, the information on the external weather conditions or the information on the road may be acquired through a sensor for sensing external conditions such as a rain sensor, a fog sensor, a temperature sensor, or the like. In addition, the information on the external weather conditions or the information on the road may be acquired from an external object communicating with the vehicle.

The vehicle speed control device of the vehicle determines a safe speed of the vehicle based on the curvature of the forward path determined in step S610 and the external weather conditions determined in step S620 (step S630). The safe speed of the vehicle may be determined such that lateral acceleration of the vehicle in a curved path does not exceed a reference value. When it is determined that it is snowing, raining, foggy, or the like, the safe speed may be reduced by a predetermined amount or rate. In addition, when it is determined that it is snowing, raining, or foggy, the reference value may be reduced by a predetermined amount or rate.

The vehicle speed control device of the vehicle measures a travelling speed of the vehicle (step S640), and determines whether the travelling speed of the vehicle is higher than the safe speed of the vehicle (step S650). When it is determined that the travelling speed of the vehicle is higher than the safe speed of the vehicle (step S650—Yes), the vehicle speed control device controls an engine or a brake to slow down the speed of the vehicle (step S660). The speed of the vehicle may be controlled based on a difference between the current travelling speed of the vehicle and the safe speed, a distance between the current location of the vehicle and a region where the safe speed has been set, a difference between an average travelling speed of the vehicle and the safe speed, and the like.

Meanwhile, when the vehicle is provided with a cruise control system or an adaptive cruise control system for allowing the vehicle to cruise at a speed set by a user, a determination is made in step S650 as to whether the travelling speed of the vehicle is higher than the lower value of the safe speed and the set cruise speed, and the travelling speed of the vehicle may be controlled based on the lower value of the safe speed and the set cruise speed in step S660.

Furthermore, when the travelling speed of the vehicle is higher than the safe speed, the vehicle speed control device may generate a warning signal to a driver. Although the step of generating the warning signal is carried out after the step of controlling the vehicle speed in FIG. 6, the present invention is not limited thereto, and the warning signal may be generated before or at the same time as the control of the vehicle speed.

Although the embodiments of the present invention have been described for illustrative purposes, those skilled in the art will appreciate that various modifications, additions and substitutions are possible, without departing from the scope and spirit of the invention. Accordingly, the embodiments disclosed in the present invention are merely to not limit but describe the technical spirit of the present invention. Further, the scope of the technical spirit of the present invention is limited by the embodiments. The scope of the present invention shall be construed on the basis of the accompanying claims in such a manner that all of the technical ideas included within the scope equivalent to the claims belong to the present invention.

What is claimed is:

1. A device for controlling a vehicle speed, the device comprising:
   a digital map unit configured to determine a current location of a vehicle and a curvature of a forward path;
   a weather information extracting unit configured to extract weather conditions outside the vehicle;
   a safe speed determining unit configured to determine a safe speed of the vehicle based on the curvature of the forward path and the extracted weather conditions;
   a vehicle speed sensor configured to measure a travelling speed of the vehicle;
   an alarm unit configured to notify a warning signal; and
   a controller configured to control the vehicle speed such that the vehicle is decelerated when the travelling speed of the vehicle is higher than the safe speed,
   wherein the weather information extracting unit comprises a driver operated sensor configured to detect an operation of a wind shield wiper and an operation of a fog light, wherein the controller is configured to generate the warning signal when the travelling speed of the vehicle is higher than the safe speed,
   wherein the safe speed determining unit is configured to calculate an allowable lateral acceleration based on the curvature of the forward path, and
   to determine the safe speed based on the allowable lateral acceleration and the extracted weather conditions, and
   wherein the safe speed determining unit is configured to calculate the safe speed by reducing the allowable lateral acceleration based on a predetermined weather condition when the weather condition extracting unit judges that it is snowing, raining, foggy, or the forward path is frozen.

2. The device of claim 1, wherein the weather information extracting unit comprises a communication unit, and is configured to receive weather information through the communication unit.

3. The device of claim 1, wherein the controller controls the vehicle speed based on a difference between the travelling speed of the vehicle and the safe speed, and a distance between the current location of the vehicle and a region where the safe speed is set.

4. The device of claim 1, further comprising:
   a cruise controller configured to maintain the vehicle at a cruise speed set by a driver,
   wherein the controller is configured to control the vehicle speed based on the lower value of the safe speed and the cruise speed.

* * * * *